(12) United States Patent
Shamia et al.

(10) Patent No.: US 7,900,031 B2
(45) Date of Patent: Mar. 1, 2011

(54) MULTIPLE, COOPERATING OPERATING SYSTEMS (OS) PLATFORM SYSTEM AND METHOD

(75) Inventors: Doron Shamia, Modiin (IL); Ron Gabor, Raanana (IL); Yoram Kullbak, Yarraville (AU); Randolph L. Campbell, Folsom, CA (US); Jimmy Scott Raynor, Raleigh, NC (US); Tiags Thiyagarajah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/200,759

(22) Filed: Aug. 28, 2008

(65) Prior Publication Data

US 2009/0064178 A1 Mar. 5, 2009

Related U.S. Application Data

(62) Division of application No. 11/195,944, filed on Aug. 3, 2005, now Pat. No. 7,437,546.

(51) Int. Cl.
*G06F 15/177* (2006.01)
*G06F 9/00* (2006.01)

(52) U.S. Cl. .............. 713/1; 713/2; 712/228; 711/154; 711/206; 709/230; 709/236

(58) Field of Classification Search ................. 713/1, 2; 712/228; 711/154, 206; 709/230, 236
See application file for complete search history.

(56) References Cited

U.S. PATENT DOCUMENTS

| | | | | |
|---|---|---|---|---|
| 5,113,522 A | * | 5/1992 | Dinwiddie et al. | 713/375 |
| 5,701,502 A | * | 12/1997 | Baker et al. | 709/201 |
| 5,809,262 A | | 9/1998 | Potter | |
| 6,370,599 B1 | * | 4/2002 | Anand et al. | 710/15 |
| 6,535,942 B1 | * | 3/2003 | Karlsson et al. | 710/260 |
| 7,043,505 B1 | | 5/2006 | Teague et al. | |
| 7,246,220 B1 | * | 7/2007 | Cheng et al. | 712/228 |
| 7,257,734 B2 | | 8/2007 | Vaidyanathan | |
| 7,437,546 B2 | | 10/2008 | Shamia et al. | |
| 7,509,391 B1 | * | 3/2009 | Chauvel et al. | 709/214 |
| 2001/0037435 A1 | | 11/2001 | Van Doren | |
| 2003/0115443 A1 | | 6/2003 | Cepulis et al. | |
| 2003/0131067 A1 | | 7/2003 | Downer et al. | |
| 2003/0158906 A1 | * | 8/2003 | Hayes | 709/211 |
| 2003/0204639 A1 | * | 10/2003 | Lake et al. | 709/310 |
| 2004/0205755 A1 | | 10/2004 | Lescouet et al. | |
| 2004/0226016 A1 | * | 11/2004 | Sreejith | 718/104 |
| 2005/0044136 A1 | | 2/2005 | Fisher | |
| 2005/0149933 A1 | * | 7/2005 | Saito et al. | 718/100 |

(Continued)

OTHER PUBLICATIONS

Notice of Allowance for U.S. Appl. No. 11/195,944, Mailed Jun.2, 2008, 7 pages.

*Primary Examiner* — Abdelmoniem Elamin
(74) *Attorney, Agent, or Firm* — Blakely, Sokoloff, Taylor & Zafman LLP

(57) ABSTRACT

A multiple, cooperating operating systems (OS) platform system with multi processors. Multiple operating systems, each of which may be of a different type or nature, can run on different partitions of the multi-processor platform and yet coexist and cooperate. A real time operating system (RTOS) executing on a processor can communicate with another OS executing on another processor via a portion of memory accessible by the RTOS and the OS by perform read and write operations.

19 Claims, 5 Drawing Sheets

U.S. PATENT DOCUMENTS

2005/0177650 A1    8/2005   Arndt et al.
2005/0188157 A1    8/2005   Kashyap
2005/0246505 A1*  11/2005   McKenney et al. ........... 711/151
2006/0107268 A1*   5/2006   Chrabieh ...................... 718/100
2006/0179487 A1*   8/2006   Hatakeyama ................... 726/26
2006/0259253 A1*  11/2006   Ellison et al. .................. 702/50

* cited by examiner

MULTIPLE, COOPERATING OPERATING SYSTEMS (OS) PLATFORM SYSTEM AND METHOD

RELATED APPLICATION

This application is a divisional application of U.S. application Ser. No. 11/195,944, filed Aug. 3, 2005 (now U.S. Pat. No. 7,437,546, issued Oct. 14, 2008).

FIELD

Embodiments are in the field of multiprocessor systems.

BACKGROUND

To provide computer users with a greater range of capabilities and greater speed, several multi-processor systems and methods have been developed. A significant percentage of current multi-processor technology involves either single operating system (OS) symmetrical shared memory multi-processor (SMP) platforms, or distributed OS platforms. In the case of SMP, one operating system controls all the central processing units (CPUs) in the system. A distributed OS on the other hand allows multiple copies of the same operating system to run on multiple partitions of an MP platform. However, both SMP and distributed OS systems have limitations. For example, neither system allows for different, specialized operating systems (particularly suited to specific tasks) on different partitions. One operating system may be extremely effective for real-time processing tasks, while another operating system may merely be a glorified transmission control protocol/Internet protocol (TCP/IP) stack with firewall capabilities, and so on. It would be desirable to allow for such a fit between the platform partition's function and the operating system selected for that function. For example, currently when a computer user runs a real-time application (such as a digital video data (DVD) or moving picture experts group (MPEG) video in a media player), and at the same time various applications are running in the background, glitches typically appear in the real-time playback data.

DETAILED DESCRIPTION

Embodiments of a multi-processor platform including multiple, cooperating operating systems are described. Multiple operating systems, each of which may be of a different type or nature, run on different partitions of the multi-processor platform, yet coexist and cooperate. In various embodiments, different specialized operating systems, suitable for particular tasks, run on different partitions of the platform. In one embodiment, a host operating system boots and partitions a portion of the platform running other operating systems, and then communicates with, and shares work with, the other operating systems. The non-host operating systems do not operate "under" the host operating system, but cooperate with it.

In another aspect of various embodiments, the partitioning is dynamically configurable. For example, partition sizes can be changed, operating systems can be torn down and replaced (for example with a DVD decoder), the number of processors allocated to various operating systems can be changed, etc. The configuration, in various embodiments, is accomplished through the host operating system via a user interface and a driver, which will be described further below. In one embodiment, the driver is a dedicated drive not so limited. In one embodiment, the driver facilitates control of non-host operating systems via inter-processor-interrupts (IPIs).

Figure 1A:
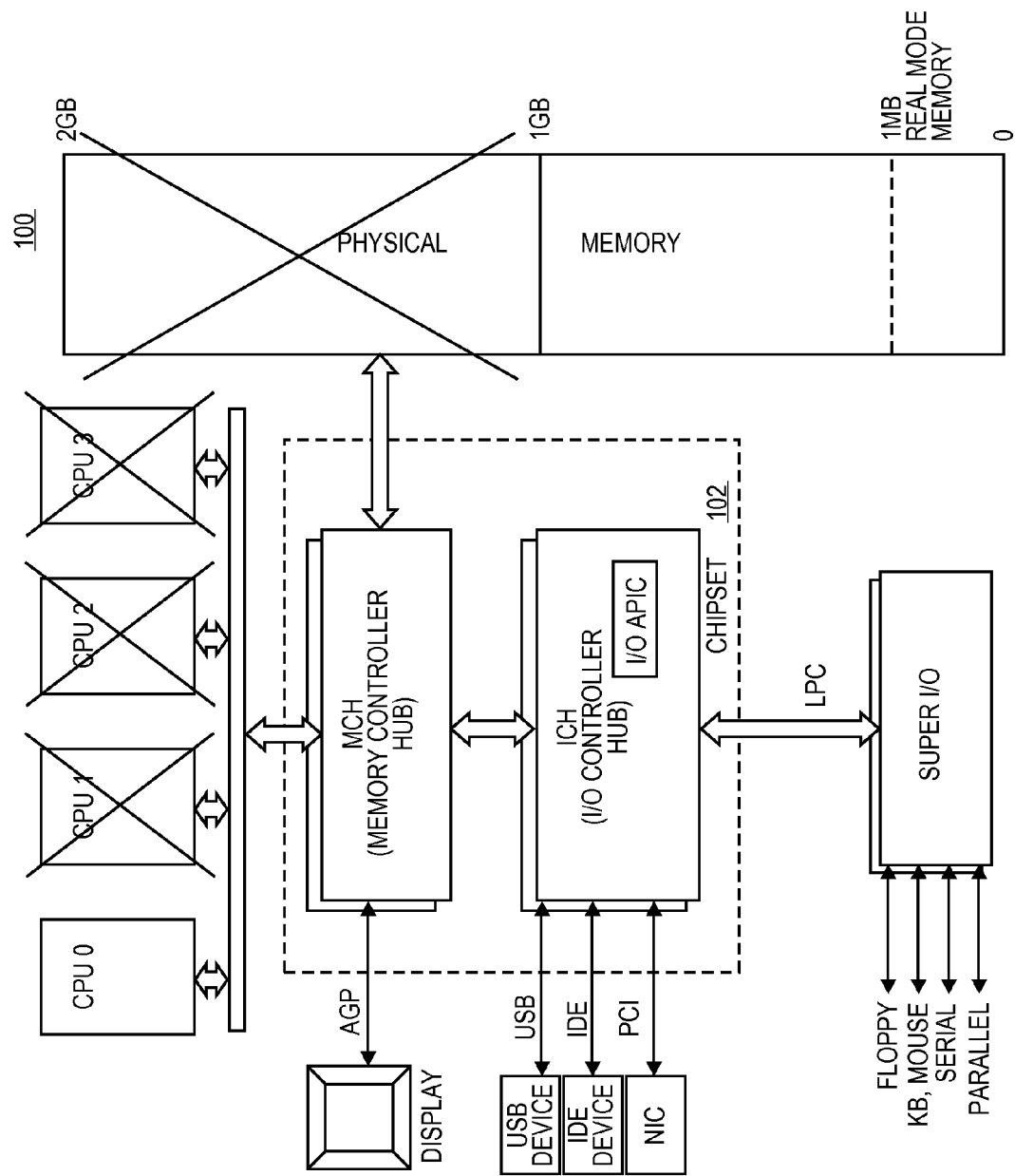
FIG. 1A is a block diagram of a multi-processor platform from the point of view of a host operating system, according to an embodiment.
Figure 1B:
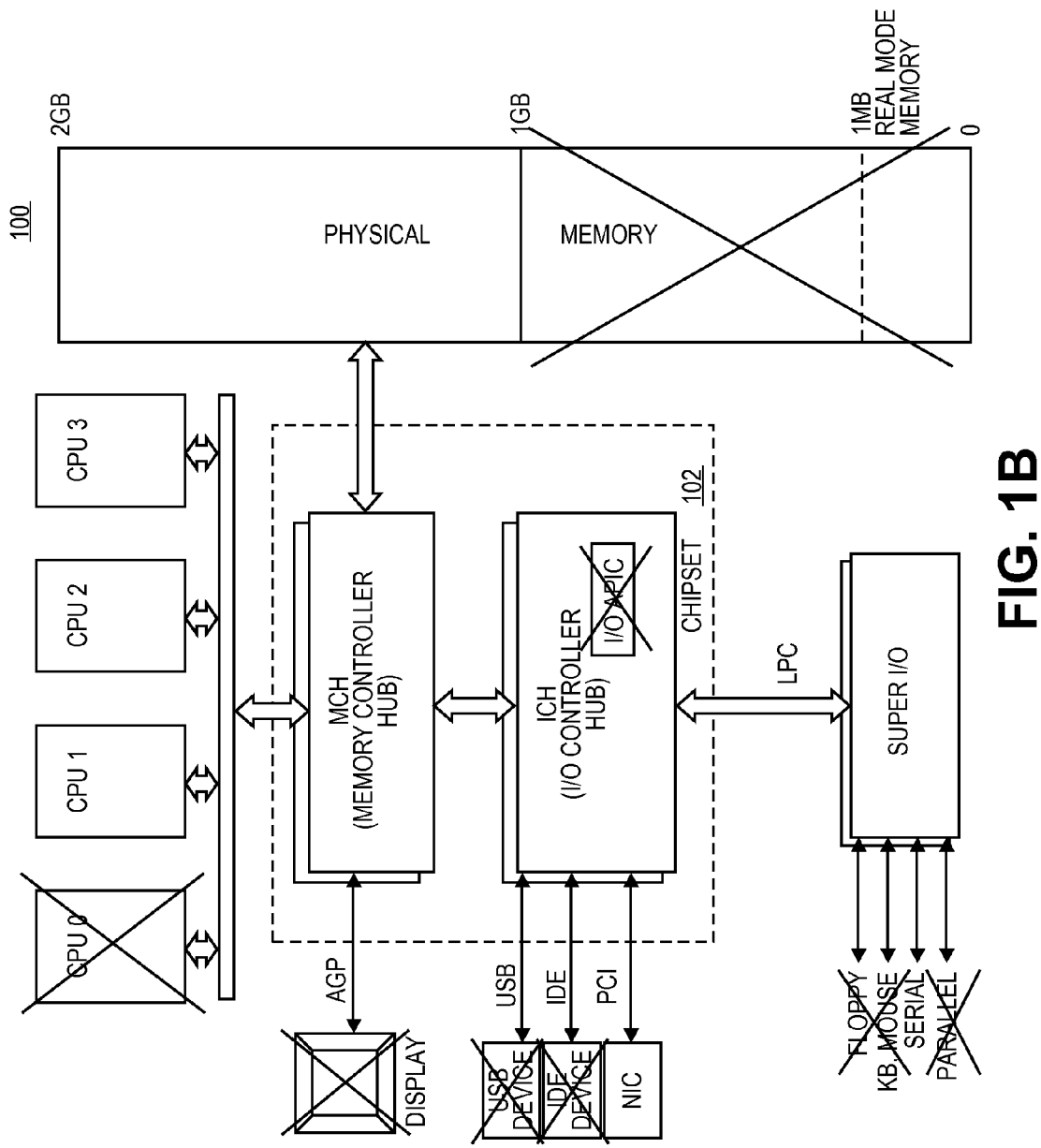
FIG. 1B is a block diagram of a multi-processor platform from the point of view of a real-time operating system (RTOS), according to an embodiment.

FIG. 1A is a block diagram of a multi-processor platform 100 from the point of view of a host operating system, according to an embodiment. In the platform of FIG. 1A, a Windows™ operating system from Microsoft Corporation is used as a host system. Other operating systems may be used as a host operating system in other embodiments. The platform 100 further includes multiple central processing units (CPUs) CPU0, CPU1, CPU2, and CPU3. Other embodiments can include more or fewer CPUs. In platform 100, the CPUs are Xeon™ processors from Intel Corporation, but in other embodiments other CPUs, or a variety of different CPUs can be used as long as they implement a signaling mechanism between them. The host operating system operates only on CPU0, as indicated by the remaining CPUs being crossed out. In one embodiment, CPU0 is the host operating system CPU, but that is arbitrary. Any of the CPUs could be the host operating system CPU. Further, the host operating system, and other operating systems on the platform 100, as described below, can be assigned to any supported number of processors out of the available pool. The partitioning shown in FIGS. 1A and 1B is an example of one possible allocation.

The CPUs communicate with a chipset through a bus as shown. The chipset includes a memory controller hub (MCH). The MCH communicates with a physical memory. As an example, the physical memory is shown to have 2 GB total memory space divided into an area above 1 G and an area below 1 G. Also, there is a real mode memory area below 1 MB. The physical memory arrangement shown is an example of an arrangement, but embodiments are not restricted to particular memory arrangements or mappings. Embodiments are further not restricted to physical memory being located in any particular area on or off the platform, whether collocated or distributed. The host operating system has access to the area of physical memory below 1 GB, including the real mode memory area, as shown by the area above 1 GB being crossed out.

The MCH communicates with a display through an accelerated graphics port (AGP), but embodiments are not so limited.

The chipset further includes an input/output (I/O) controller hub (ICH). The ICH includes interrupt routing hardware in the form of an I/O advanced programmable interrupt controller (APIC). As further described below, the host operating system uses the I/O APIC for receiving and dispatching interrupts. Other "non-host" operating systems, for example one or more real-time operating systems, use a programmable interrupt controller (PIC). Embodiments include mechanisms allowing both operating systems to communicate via interrupts.

The ICH communicates with various peripheral devices as shown through a universal serial bus (USB) interface, an integrated drive electronics (IDE) interface, and a peripheral component interconnect (PCI) interface, but embodiments are not so limited.

The ICH communicates with a super I/O unit through a low pin count (LPC) interface. The super I/O unit provides communication with a floppy drive, a keyboard, a mouse, a serial port, and a parallel port.

Note that each of the operating systems above can be assigned any supported number of processors out of the available pool. The partitioning described above is an example of one possible allocation. FIGS. 1A and 1B are an example of a configuration, but other configurations are within the scope of embodiments. For example, there could be more than one host processor in a platform.

FIG. 1B is a block diagram of the platform 100 from the point of view of another operating system on the platform 100 other than the host operating system. In one embodiment, the other operating system is a real-time operating system (RTOS). A real-time operating system is used as an example of another operating system on the platform 100 in addition to the host operating system. Any other type of operating system could be used. In one embodiment, the real-time operating system is a QnX™ RTOS from QnX™ Corporation. Examples of other commercially available real-time operating systems include LynxOS, pSOS, and several others. Open source real-time operating systems include RTLinux, FreeRTOS, and several others.

The RTOS does not run on CPU0, but has access to and runs on the other CPUs (CPU1, CPU2, and CPU3). The physical memory accessible by the RTOS is the upper portion above 1 GB. These portions of physical memory allocated to the different operating systems are configurable, and the configuration shown is just an example.

The RTOS controls none of the system devices which are shown crossed out, and is allowed access to a serial port and a dedicated network interface controller (NIC). The host operating system does not control any of the RTOS visible devices. In one embodiment, the NIC of FIG. 1B is a second, dedicated NIC for the non-host OS that is different from the NIC in FIG. 1A. However in another embodiment, the NICs in FIGS. 1A and 1B are the same NIC and are accessed by the non-host OS via the driver as a proxy.

In one embodiment, the host OS exclusively owns most devices on the platform 100. However host OS and non-host OS both share memory, and all communications are done via shared memory (in a region of memory accessible to both host OS and non-host OS). If the non-host OS wants services from devices owned by the host OS (such as access to disk), the non-host OS sends a request to the driver which represents the non-host OS, or proxies it, in the host OS environment.

As described in more detail below, the host operating system (Windows™ in one embodiment) is booted on the CPU0, which is the bootstrap processor (BSP), and any required number of application (AP) processors (via boot.ini parameters in one embodiment). The RTOS (QnX™ RTOS in one embodiment), is booted on the remaining AP processors. The startup code of the RTOS is modified in one embodiment to allow booting the RTOS from the host processor as described further. It is not necessary to modify the operating system kernel to achieve the described functionality, according to embodiments.

Figure 2:
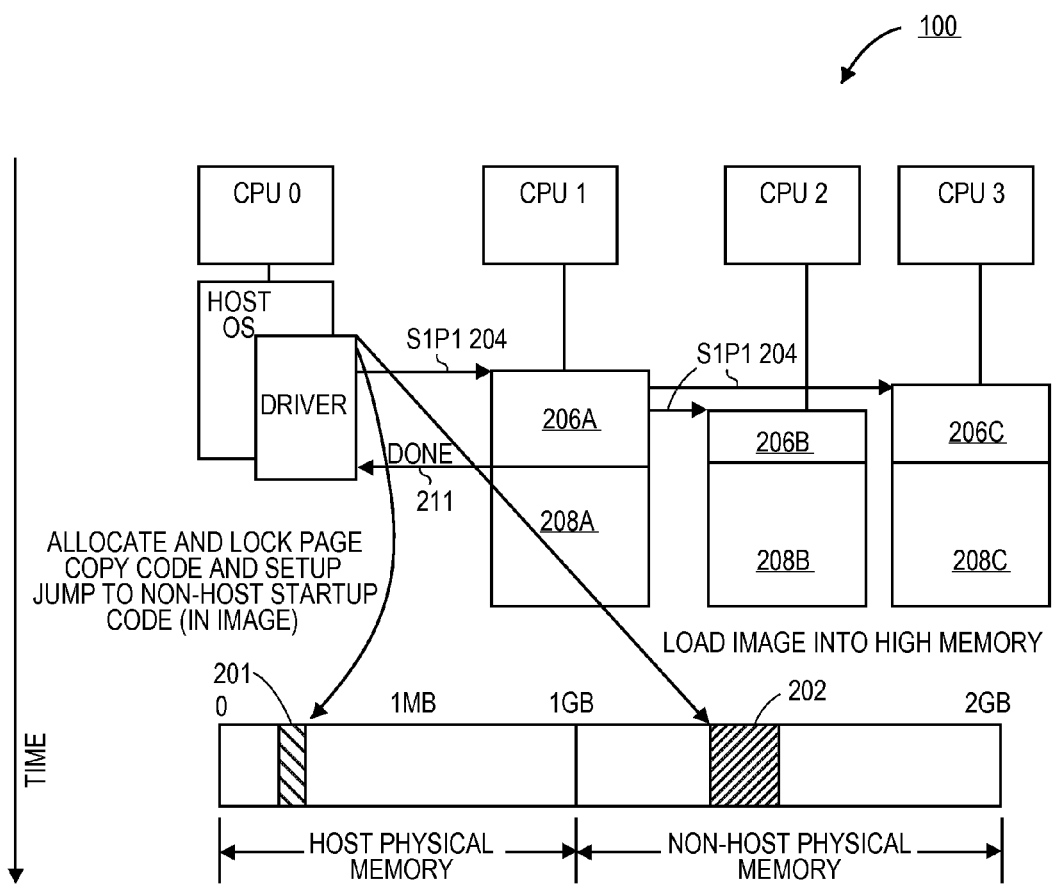
FIG. 2 is a block diagram of elements of a multi-processor platform involved in the boot sequence, according to an embodiment.

FIG. 2 is a block diagram of elements of the multi-processor platform 100 involved in the boot sequence, according to an embodiment. The partitioning of CPUs and memory is configurable using initialization parameters. The configuration shown is just one example. FIG. 2 is used to illustrate a boot sequence with reference to the time line on the left of the diagram.

CPU0 is shown as a BSP CPU operating a host operating system (host OS). According to an embodiment, a dedicated driver is loaded to the host OS.

The host OS boots normally on CPU0 (the BSP), with a modified boot.ini instructions file in one embodiment, which instructs it to ignore the rest of the CPUs (/numproc=1), and limiting its use of physical memory to the range of 0 to 1024 MB (/maxmem=1024).

The dedicated driver is used to load a non-host operating system (non-host OS) image 202 into an area of memory that the host OS does not use. This area of memory will be referred to as a "non-host" area of memory. In an embodiment, the non-host physical memory is from 1 GB to 2 GB. The driver allocates and locks (so that the host OS will not swap it out) a real mode page 201 in the host OS physical memory. The dedicated driver then loads non-host boot code into the real mode page 201. In one embodiment, the non-host boot code is modified, and includes a jump instruction to the start of the non-host OS image 202. The driver also places the non-host OS image into its designated "non-host" memory 202.

CPU1 is booted by initiating a startup-inter-processor-interrupt (SIPI) 204. The SIPI 204 instructs CPU1 to start executing code located at the page 201 in the lower 1 MB of physical memory. The page 201 also contains a dedicated startup code, which sets up CPU1 for operation. For example, the code sets up stacks, sets up segments, and switches to protected mode. The code also jumps to a non-host OS startup-bios 206A entry point, which is part of non-host OS image 202.

CPU1 starts executing the non-host OS startup-bios 206A, which starts up a non-host OS micro-kernel 208A. The startup-bios 206A sets up the non-host OS's system-page, which defines the system resources, capabilities, interrupts, page tables, etc., used by the micro-kernel. The startup-bios 206A then uses a SIPI 204 to start its code (from a certain entry point) on the rest of the non-host OS CPUs (in our example, CPU2 and CPU3), as indicated by image 206B and image 206C. The startup-bios 206A also loads the micro-kernel 208A, from an ELF32 file in one embodiment, located on the non-host OS image that is already in memory, and eventually jumps to it (on all non-host OS CPUs, as shown by micro-kernel 208B and micro-kernel 208C). Each of the non-host CPUs subsequent to CPU1 notifies CPU1 when it is booted. Before the startup-bios 206A jumps to the micro-kernel, it determines whether all of the non-host CPUs are booted. When all of the non-host CPUs are booted, CPU1 notifies the driver, as shown by the arrow 211, that it is done with the real-mode page 201 that was used to startup CPU1, CPU2, and CPU3. The driver then unlocks and frees the real mode page 201.

Once the above boot sequence is finished, the two operating systems (host operating system and non-host operating system) are both running and coexist, however they are not yet communicating. The non-host OS is booted by the driver. The non-host OS is not running inside the host OS, rather alongside it. The mechanisms through which the host OS and the non-host OS communicate are based on directed inter-processor-interrupts (IPIs) and shared memory in one embodiment. In one embodiment, the non-host OS disregards broadcast IPIs sent by the host OS, while never sending broadcast IPIs itself. In one embodiment, the non-host OS is modified to include this functionality.

The driver generates an IPI to each of the non-host OS-owned processors (CPU1, CPU2, and CPU3), triggering a handler. The handler may use a pre-defined shared memory message queue to access a message (if any). Any locks, and/or synchronization objects are built on top of the signaling and shared memory allocation/de-allocation services.

In one embodiment, the host OS is a version of Windows™, and the non-host OS is a real-time OS (RTOS) such as QnX™.

Figure 3:
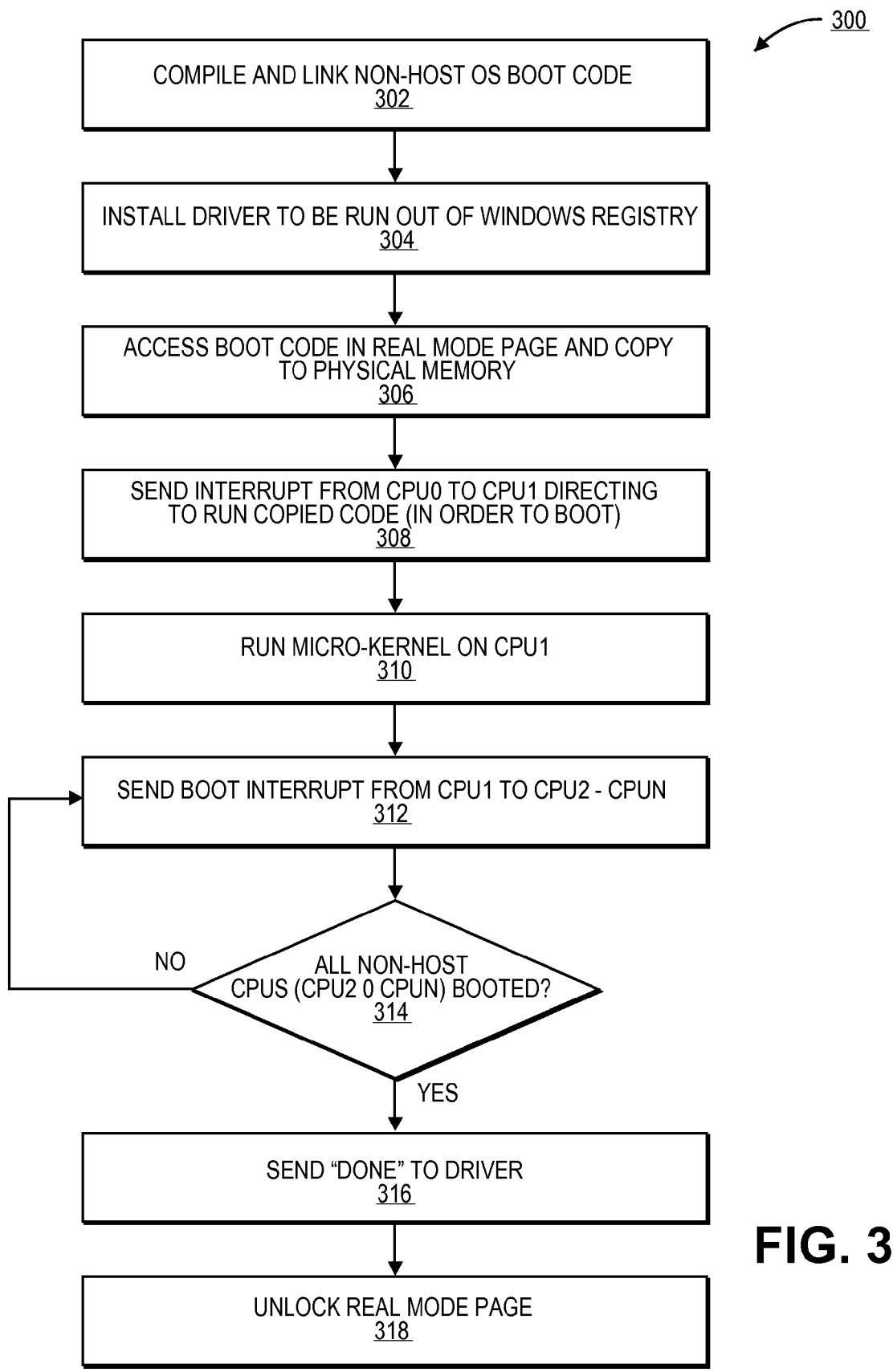
FIG. 3 is a flow diagram of a boot sequence, according to an embodiment.

FIG. 3 is a flow diagram of a boot sequence 300 according to an embodiment. At 302, non-host boot code is compiled and linked. In one embodiment, the non-host OS is a real-time operating system. At 304, a dedicated driver is installed to run out of the host operating system, which in one embodiment includes a Windows™ registry. At 306, the boot code of the non-host OS is accessed from the real mode memory page and copied to a non-host physical memory area. An interrupt is sent at 308 from CPU0 to CPU1 directing CPU1 to run the non-host boot code in order to boot CPU1. The non-host boot code includes a jump instruction to the non-host image. At 310, a non-host micro-kernel is run on CPU1, and at 312, a boot interrupt is sent from CPU1 to all other non-host CPUs (CPU2-CPUN) in sequence. The boot interrupt causes each of the no-host CPUs to boot the non-host OS. At 314, it is determined whether all of the non-host CPUs have booted the non-host OS. If all of the non-host CPUs have booted the non-host OS, a "done" signal is sent to the driver at 316. In one embodiment, the "done" signal is sent to the driver by non-host CPU1. The driver receives the "done" signal and, in response, unlocks the real mode memory page at 318.

If all of the non-host CPUs have not booted the non-host OS, the process returns to 312, at which boot interrupts are sent from CPU1 to the other non-host CPUs.

Figure 4:
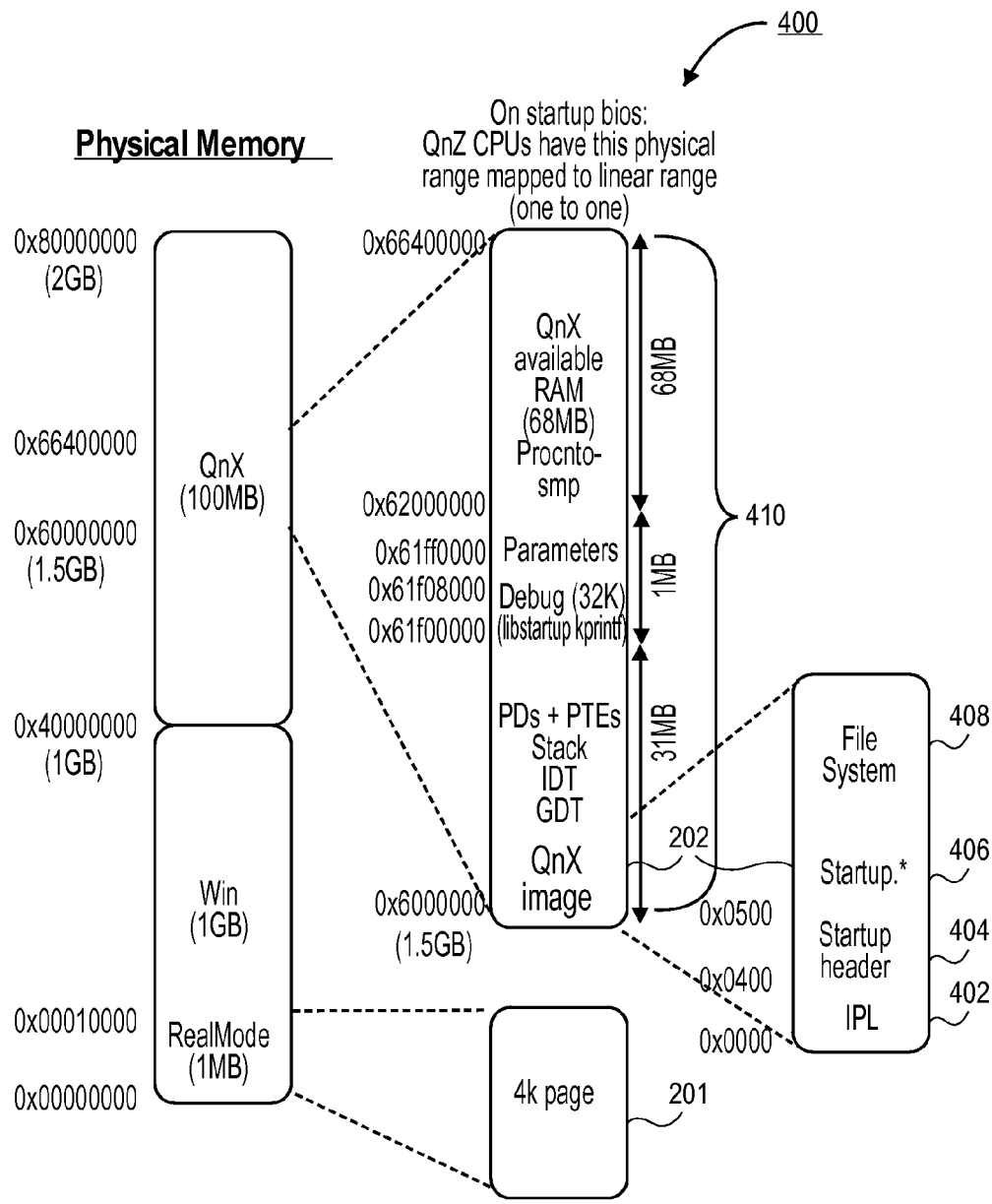
FIG. 4 is a block diagram of physical memory mapping of a multi-processor platform, according to an embodiment.

FIG. 4 is a block diagram of physical memory mapping 400 of the multi-processor platform 100, according to an embodiment. FIG. 4 shows how the memory is used/partitioned between the Windows™ operating system and the QnX™ operating system, and further details the internal mappings of the QnX™ boot image. Earlier figures showed a Windows™ portion of memory and a QnX™ portion of memory. Each operating system sees only its own portion. This is further illustrated with additional detail in FIG. 4, in which the physical memory on the left is divided into a QnX™ 100 MB portion ("QnX™ memory" at the top) and a Windows™ 1 GB portion ("Windows™ memory" at the bottom). At the bottom of the Windows™ memory is a 1 M real mode section within which there is the 4K page of code 201 that includes the modified QnX™ boot code. The modified code, in one embodiment approximately 50 lines of assembly code, is inserted in the 4K page of code 201 in the real mode portion of memory by the driver when instructed to start the RTOS boot sequence. In one embodiment, CPU1 boots in a real mode and then is placed in a protected mode in which the CPU1 has access to physical memory above the real mode area, however the embodiments are not so limited.

The QnX™ area of memory includes 100 MB in one embodiment, which includes the actual QnX™ image 202 and various other structures 410 built by the QnX™ image as described below. The QnX™ image 202 includes an initial program loader (IPL) 402 which is the first part of the boot sequence that is jumped to from the 4k page 201. In one embodiment, the IPL 402 is present in the proprietary QnX™ image, but it is not used. Rather, the IPL 402 is replaced with modified code that performs similar activities appropriate to the platform, such as taking QnX™ processors from real mode to protected mode, etc. In other embodiments the IPL supplies the appropriate functionality.

The QnX™ image 202 further includes a start header 404 that includes multiple parameters, e.g., regarding which memory regions QnX™ owns, where in memory the QnX™ image was loaded, a file system offset inside the image, etc. Actual startup code 406 is code that is modified according to an embodiment, such that QnX™ can be booted from the host operating system. In one embodiment, the startup code is a library that is linked into the QnX™ image and holds most of the modifications introduced to the QnX™ operating system to allow the QnX™ operating system to operate in a sequestered environment. The startup code 406 builds data structures 410 on top of the QnX™ image 202.

The QnX™ image 202 also includes an embedded filed system 408. The file system 408 is a QnX™-managed, internal, encapsulated file system that QnX™ holds adjacent to its micro-kernel with any other files that may be required during operations. Any executable file may be placed in the file system 408 on creation, or later via any network file transfer mechanism, e.g., file transport protocol (FTP).

The data structures 410 in one embodiment include data structures specific to the CPUs. In one embodiment, the data structures allow operation of the operating system in protected mode. For example, a global descriptor table (GDT), and an interrupt descriptor table (IDT) that allows interrupts to be received by QnX™ from the host operating system as described previously. The data structures 410 further include a stack, page directories (PD) and page table entries (PTE). The debug section is included in an embodiment to allow for data to be written to memory and read from Windows™ for debug purposes. A parameter section "ceQnX™ parameters" includes data copied from the driver to the QnX™ portion for controlling how QnX™ boots. The parameter section is similar to the startup header, however because the startup header is fixed in size and structure the parameter section is used in an embodiment to store additional data for control of the boot sequence as well as other parameters.

The "procntosmp" is the actual QnX™ kernel that is copied by the QnX™ image to the location shown. Random access memory (RAM) available to QnX™ is above the procntosmp. The memory addresses shown in the middle section of FIG. 4 include the physical range that is mapped to the linear range for each of the non-host CPUs in the platform.

In another aspect of various embodiments, the partitioning is dynamically configurable. For example, partition sizes can be changed, operating systems can be torn down and replaced (for example with a DVD decoder), the number of processors allocated to various operating systems can be changed, etc. The configuration, in various embodiments, is accomplished through the host operating system via a user interface and the driver. The user interface may be any known interface that operates on top of the host operating system, such as a graphical user interface (GUI). In one embodiment, the driver facilitates control of non-host operating systems via inter-processor-interrupts (IPIs), as previously described.

Embodiments described enable dynamic application load balancing. For example background applications can be off-loaded to different partitions such that the main partition runs well without the additional overhead. Various partitions, for example, can own one or more network cards. All the packets coming in from the network are scanned for viruses by this partition. As another example, media applications such as a DVD application can be offloaded to a specific partition that specializes in the relevant applications, such as DVD decoding. The partition may include specific software and a relatively small operating system that specializes in DVD decoding for example.

Specialized clusters are also contemplated. For example, in Windows™ today, there is no real time subsystem. There are third-party products that provide real-time processing and can be installed into Windows™. However, these typically share the processor with Windows™ and are not functioning as separate partitions. According to embodiments described herein, CPU1 CPU2 and/or CPU3, can run an RTOS that is isolated from Windows™ in the sense that applications that are opened in Windows™ do not interfere with what is running on the RTOS. In one example, Windows™ reads DVD data from a disc and sends pointers to buffers containing the data to the RTOS. The RTOS takes the buffers and decodes them and provides them back to Windows™. The RTOS does the decode work without dependence on Windows™ and then sends a message to Windows™ indicating where the decoded buffer is. Windows™ takes the decoded buffer and displays it. The actual real time work is just on the RTOS side.

Aspects of the multiple operating system platform system and method described herein are not intended to be limited to the embodiments described. For example, the system and method are also applicable to server platforms that may include many more processors than shown herein. The embodiments shown herein are more characteristic of a system that includes multiple personal computers (PCs), but the scope of the invention is not so limited.

Aspects of the multiple operating system platform system and method described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the multiple operating system platform system and method include: microcontrollers with memory (such as EEPROM), embedded microprocessors, firmware, software, etc. Furthermore, aspects of the multiple operating system platform system and method may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable storage media in which such formatted data and/or instructions may be embodied include, but are not limited to, non-volatile storage media in various forms (e.g., optical, magnetic or semiconductor storage media). Computer-readable propagation media include, but is not limited to, carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of multiple operating system platform systems and methods is not intended to be exhaustive or to limit the platform to the precise form disclosed. While specific embodiments of, and examples for, the platform are described herein for illustrative purposes, various equivalent modifications are possible within the scope of the platform, as those skilled in the relevant art will recognize. The teachings of the platform system and method provided herein can be applied to other systems and methods, not only for the systems and methods described above.

The elements and acts of the various embodiments described above can be combined to provide further embodiments. These and other changes can be made to the platform in light of the above detailed description.

In general, in the following claims, the terms used should not be construed to limit the platform to the specific embodiments disclosed in the specification and the claims, but should be construed to include all systems and methods that operate under the claims. Accordingly, the platform is not limited by the disclosure, but instead the scope of the platform system and method is to be determined entirely by the claims.

While certain aspects of the platform are presented below in certain claim forms, the inventors contemplate the various aspects of the platform in any number of claim forms. For example, while only one aspect of the platform is recited as embodied in machine-readable medium, other aspects may likewise be embodied in machine-readable medium. Accordingly, the inventors reserve the right to add additional claims after filing the application to pursue such additional claim forms for other aspects of the platform system and method.

What is claimed is:

1. A system comprising:
    a central processing unit (CPU) and a second processor of a multi-processor platform;
    a first operating system (OS) to execute on the CPU, wherein the second processor is isolated from the first OS;
    a real time operating system (RTOS) to execute on the second processor; and
    at least a portion of a memory coupled to the CPU and to the second processor, wherein the memory portion is accessible by the first OS and the RTOS to perform read and write operations, and wherein the first OS is to offload a task to the RTOS for execution.

2. The system of claim 1, wherein the RTOS is further to:
    be booted by the first OS; and
    operate independently of the first OS, wherein code running on the CPU does not interfere with code running on the second processor.

3. The system of claim 1, wherein the second processor is an embedded processor.

4. The system of claim 1, wherein the memory portion is accessible by the first OS and the RTOS to execute a message-passing operation between the first OS and the RTOS.

5. The system of claim 1, wherein the memory portion is accessible by the first OS to write data that is to be operated upon by the RTOS and the memory portion is accessible by the RTOS to read the data.

6. The system of claim 1, wherein the memory portion is accessible by the RTOS to write data that is to be operated upon by the first OS and the memory portion is accessible by the first OS to read the data.

7. The system of claim 1, wherein the first OS is to initiate boot of the RTOS via a directed inter-processor-interrupt (IPI) from the CPU to the second processor.

8. A multiple operating system method comprising:
   executing a first operating system (OS) on a first processor of a multi-processor platform;
   executing a real-time operating system (RTOS) on a second processor of the multi-processor platform, wherein the second processor is isolated from the first OS, and wherein the first OS is to offload a task to the RTOS for execution; and
   performing read and write operations by the first OS and the RTOS on at least a portion of a memory coupled to the multi-processor platform.

9. The method of claim 8 further comprises:
   booting the RTOS by the first OS; and
   operating the RTOS independently of the first OS, wherein code running on the first OS does not interfere with code running on the RTOS.

10. The method of claim 8 further comprises executing a message-passing operation between the first OS and the RTOS.

11. The method of claim 8 further comprises:
    writing data in the memory portion by the first OS that is to be operated upon by the RTOS; and
    reading the data by the RTOS.

12. The method of claim 8 further comprises:
    writing data in the memory portion by the RTOS that is to be operated upon by the first OS; and
    reading the data by the first OS.

13. The method of claim 8 further comprises:
    initiating boot of the RTOS via a directed inter-processor-interrupt (IPI) from the CPU to the second processor.

14. A computer readable storage medium having instructions stored thereon which, when executed in a system, cause the performance of a multiple operating system method comprising:
    executing a first operating system (OS) on a first processor of a multi-processor platform;
    executing a real-time operating system (RTOS) on a second processor of the multi-processor platform, wherein the second processor is isolated from the first OS, and wherein the first OS is to offload a task to the RTOS for execution; and
    performing read and write operations by the first OS and the RTOS on at least a portion of a memory coupled to the multi-processor platform.

15. The medium of claim 14, wherein the multiple operating system method further comprises:
    booting the RTOS by the first OS; and
    operating the RTOS independently of the first OS, wherein code running on the first OS does not interfere with code running on the RTOS.

16. The medium of claim 14, wherein the multiple operating system method further comprises executing a message-passing operation between the first OS and the RTOS.

17. The medium of claim 14, wherein the multiple operating system method further comprises:
    writing data in the memory portion by the first OS that is to be operated upon by the RTOS; and
    reading the data by the RTOS.

18. The medium of claim 14, wherein the multiple operating system method further comprises:
    writing data in the memory portion by the RTOS that is to be operated upon by the first OS; and
    reading the data by the first OS.

19. The medium of claim 14, wherein the multiple operating system method further comprises:
    initiating boot of the RTOS via a directed inter-processor-interrupt (IPI) from the CPU to the second processor.

* * * * *